July 8, 1969

R. L. HURTLE 3,454,832

ELECTRIC CIRCUIT INTERRUPTER

Filed Aug. 24, 1967

INVENTOR
RALPH L. HURTLE
BY Robert A. Casey
ATTORNEY

United States Patent Office 3,454,832
Patented July 8, 1969

3,454,832
ELECTRIC CIRCUIT INTERRUPTER
Ralph L. Hurtle, West Hartford, Conn., assignor to General Electric Company, a corporation of New York
Filed Aug. 24, 1967, Ser. No. 662,960
Int. Cl. H02h 3/08
U.S. Cl. 317—11                                19 Claims

ABSTRACT OF THE DISCLOSURE

An electric circuit interrupter, including a first automatic switching device and a first current limiting device connected together in series relation; an actuating coil of the first switching device is connected in parallel with the first current limiting device; a by-pass circuit around the first switching device and first current limiter combination comprises a second current limiting device in series with a second automatic switching device; on high current the first current limiting device changes to high impedance state and develops a voltage which actuates the second automatic switching device, closing the by-pass circuit; the same voltage actuates the first switching device to open condition interrupting the reduced current in that path; the second current limiting device limits current in the by-pass path, the reduced current then being interrupted by the second switching device.

BACKGROUND OF THE INVENTION

Field of the invention

The present invention relates to electric circuit interrupters, and more particularly to circuit breakers of the type which are capable of performing a current limiting function in circuits of substantial voltage and current rating, such for example as 600 volts and 100,000 amperes available short circuit current.

Discussion of the prior art

Because of the constantly increasing capacity of electric power generating plants and the proportionately increasing values of short circuit currents encountered in electrical systems, the need has arisen for circuit breakers which not only interrupt the current, such as by drawing and extinguishing an arc, but which limit the value of the maximum current surge which flows during the interrupting process. Accordingly, "current limiting" circuit breakers have been developed including means for moving the movable contact element in opening direction upon the occurrence of short-circuit conditions without waiting for the main operating mechanism to move, and without waiting for the release of latched element, etc.

In circuits of large capacity, the movable contact element or elements must necessarily be relatively large in order to carry the required current without excessive heating. The required size and weight of such contact elements increase the difficulty of moving them in contact opening direction at the very high speeds required in order to provide a current limiting action.

OBJECTS OF THE INVENTION

It is an object of the present invention to provide an electric circuit interrupter capable of carrying substantial currents at substantial voltages, in which a current limiting action can nevertheless be achieved by the motion of relatively light contact elements.

It is another object of the invention to provide such an electric circuit breaker which can be constructed at relatively low cost and which utilizes components which are individually of relatively simple construction.

In accordance with the invention, I provide a circuit arrangement including a first automatic switching device connected electrically in series with a current limiting means so as normally to pass current required by a protected load and having contacts of adequate size and weight to carry such current. Normal switching operations are performed by operating the automatic switching device between open and closed circuit positions. For the purpose of assisting interruption of high abnormal currents such as high overload or short circuit currents, I provide a by-pass or shunting path around the aforesaid series combination of first electric switching device and first current limiting means, the shunt path including a second automatic switching device and a second current limiting device in series. I further provide means whereby the change of the impedance of the first current limiting device from its normal low impedance state to its high impedance state upon the occurrence of abnormal current condition therethrough produces a voltage drop thereacross which performs two functions: (1) it initiates closing of the second automatic switching device to by-pass the current around the first automatic switching device, and (2) it initiates opening of the first automatic switching device to open the first or "main" current path to interrupt the reduced current therein. The second current limiting device then acts to reduce the current in the by-pass path, and finally the current is completely interrupted in the second switching device. By this arrangement, a first switching device may be used which is best designed to carry and to switch the normal or rated currents of the load circuit to be controlled, and the second automatic switching device may be constructed of a size, weight, and capacity only as large as is required to carry the current involved for the relatively short length of time in which it is by-passed and until it is interrupted in the by-pass circuit. Accordingly the second switching device may comprise a high speed current limiting type electric circuit breaker such as of the construction shown and described in detail in my co-pending patent application Serial No. 457,557, filed May 21, 1965, or it may comprise a "vacuum gap" device which conducts current therethrough after initial breakdown by relatively high voltage only until the next natural current zero period occurs in the alternating current wave cycle, or it may comprise a solid state electric switching device, or in fact any other suitable current controlling device.

In preferred forms of the invention, the current limiting means employed in series with the first and second automatic electric switching devices respectively comprises devices of the vaporizable conductor type which include a conductor segment changing from metallic condition to a high resistance vapor condition and subsequently recondensing to the metallic conducting condition, such for example as described in my Patent No. 3,117,203, issued Jan. 7, 1964 and assigned to the same assignee as the present invention.

Additional objects and features of the invention together with the attendant advantages thereof will be more fully appreciated and understood from the following detailed description, taken in conjunction with the accompanying drawings, wherein like parts in each of the several figures are identified by the same reference character.

DESCRIPTION OF THE PREFERRED EMBODIMENT

Figure 1:
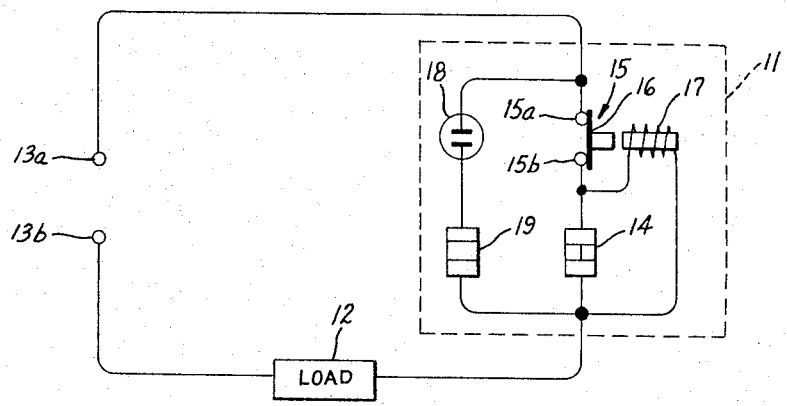
FIGURE 1 is a schematic diagram of an electric circuit interrupter incorporating the invention.

FIGURE 1 is a schematic circuit diagram of one form of protective circuit interrupter constructed in accordance with the invention. The circuit interrupter shown within the dotted outline 11 is connected in series circuit relationship with a load 12 across a pair of power supply terminals 13a and 13b. The invention may be utilized in either alternating current or direct current power supply systems. For the purpose of this discussion, an alternating current supply souce will be assumed unless otherwise stated.

The circuit interrupter 11 comprises a current limiter 14 of the vaporizable conductor type. The current limiter 14 preferably is of the type described in U.S. Patent No. 3,117,203, R. L. Hurtle, issued Jan. 17, 1964, entitled, "Circuit Protective Devices and Circuits," and in my application Ser. No. 662,968, filed Aug. 24, 1967, both assigned to the same assignee as the present invention and to which reference is made for a more complete description of this device. In order to facilitate an understanding of the present invention, however, the following brief description of the current limiter 14 is provided. The current limiter 14 is a fast operating, current-limiting protective device for power circuits. It comprises a body of strong and inelastic, nonporous, ceramic insulating material having at least one capillary passage formed therein between its terminals filled with a vaporizable conductive metal, preferably mercury. The arrangement is such that the conductive material in the capillary is capable of carrying a predetermined amount of current with low loss and without substantial change in its electrical properties. However, when the device is subjected to excessive currents of sufficient magnitude to vaporize the conductive material within the capillary, an extremely high-pressure, high-resistance, arc is established in the capillary which develops a high-voltage drop and limits the current flow therethrough to a predesigned low value. In the form disclosed in my aforementioned Patent 3,117,203, the device halts the rise of short circuit current and then sharply reduces its value to a relatively low level, at which the current is maintained or "regulated" until supplementary means interrupts the circuit. This form is therefore referred to as a "regulating current limiter."

In the form shown in aforementioned patent application, the current is reduced to zero by the current limiter and maintained at zero for a short space of time. This "off" time, although very short, is long enough to permit a controlled conductivity solid state device such as a silicon controlled rectifier, to resume its non-conducting state in the absence of turn-on bias. It is likewise long enough to permit a vacuum gap type device to become non-conductive and to remain so in the absence of sufficient breakdown voltage. This type of current limiter is referred to as a "quenching" current limiter to distinguish it from the "regulating" type described previously.

The current limiter 14 is connected in series relation with the contacts 15a, 15b and 16 of an automatically operable switching device 15 which includes an actuating winding 17. The actuating winding 17 is connected in parallel circuit relationship with the current limiter 14 and thereby opens the contacts 15a, 15b and 16. Manually operable means, not shown, may be and preferably is provided for reclosing the contacts 15a, 15b and 16.

If desired, the switching device 15 may comprise a thermally actuated device having a bimetallic actuating element, or may comprise a combined thermal-magnetic actuated device. My aforesaid patent, No. 3,117,203, for example, discloses such a combined thermal-magnetic contactor mechanism mounted in a unitary structure with a current limiter. The device disclosed in FIGURE 7 of Patent 3,117,203 may be employed to form the circuit branch including contacts 15a, 15b and 16, winding 17 and current limiting device 14. However, each of these elements may also be physically separate, and connected in circuit relationship as described.

In addition to the circuit branch comprising contacts 15a, 15b and 16 and current limiting device 14, interruption assisting means is provided comprising a voltage responsive switching means formed by a vacuum gap interrupter 18 and a current limiting device 19 connected together in series relation, this combination being then connected in parallel with the series combination of contacts 15a, 15b and 16 and current limiter 14.

The vacuum gap switching means 18 comprises a pair of spaced-apart fixed electrodes supported within an evacuated chamber. Upon a sufficient voltage being applied across the two spaced-apart electrodes of the vacuum gap, which voltage exceeds a predetermined value, the gap breaks down and conducts current between the two fixed electrodes. Thereafter if the driving voltage is reduced, the arc between the two spaced apart electrodes is extinguished and the vacuum gap interrupter resumes its normal current blocking condition. Such vacuum gap devices are commercially available from a large number of manufacturers, and may be obtained in a wide number of current and voltage ratings. For a more detailed description of suitable two electrode vacuum gap interrupters that can be employed as the device 18, reference is made to U.S. Patents 2,397,892 and 2,859,373. It should be expressly understood, however, that the invention is not limited to the use of the particular two electrode vacuum gap structures disclosed in these patents, and may employ any type of two electrode gap structure such as an ionizable gas-filled gap, air gaps, etc.

In operation the circuit of FIGURE 1 functions in the following manner when interrupting alternating current. Upon closure of the contacts 15a, 15b and 16, load current is supplied to the load 12 from supply terminals 13a, 13b through the switching device 11. For so long as the current in the circuit remains below a predetermined level, the contacts 15a, 15b and 16 remain closed. Upon the occurrence of an excess current condition sufficient to actuate or "fire" the current limiter 14, the current limiter 14 changes from a low impedance state to a high impedance state, developing a substantial voltage thereacross. This voltages causes the vacuum gap device 18 to break down and conduct current. Immediately following breakdown of device 18, the current flowing in the path including contacts 15a, 15b and current limiter 14 is transferred to the parallel path including gap device 18 and current limiter 19. When the current limiter 14 fires, it acts immediately to limit the current flow through the branch including contacts 15a, 15b and 16 to a predesigned low value. Concurrently with the breakdown of the gap device 18, the voltage developed across the current limiter 14 actuates the winding 17 and causes it to open the contacts 15a, 15b and 16, which are maintained open by any suitable means, not shown. The transfer of the current to the parallel assisting path is accelerated by the arcs which introduces resistance into the main path. Moreover, the arc resistance increases its voltage as the current decreases, due to the negative resistance vs. current characteristic of electric arcs in air. This process continues until all of the current is transferred to the parallel assisting path, and the arcs between separated contacts 15a and 15b are extinguished, completing interruption of the current in the main circuit branch.

The regulating current limiter 19 tolerates a small amount of current flow therethrough with little resistance; however, upon the current exceeding a predesigned value, the vaporizable conductive metal contained in the capillaries therein is vaporized and introduces high resistance in the circuit branch including the elements 18 and 19 so as to reduce the current through this branch to a relatively low value and to maintain the current at this low value until the next current-zero point of the A-C cycle, at which time conduction through the vacuum gap device 18 ceases. Conduction does not resume in the next half cycle period because the voltage across the device 18 which is essentially live voltage, is not great enough to break down the gap. Also, it will be observed that at this time, the contacts 15a, 15b of the contact are fully separated and the contactor has had time to recover its dielectric blocking capability. Hence, further current flow to the load is blocked. The above described current interruption operation is accomplished with a minimum of arcing between the physically separable contacts 15a, 15b and 16 while they are opening because of the effect of the parallel assisting current path established through vacuum gap interrupter 18 and current limiter 19. Accordingly, from the above description it will be appreciated that the circuit serves to immediately limit the current to a predetermined, safe, low value and to facilitate complete interruption of current flow by reducing the current to a sufficiently low value to enable the set of movable contacts and the vacuum gap interrupter to be readily extinguished.

While many desirable objectives are achieved by the invention in the form just described, further benefits are also provided in accordance with the invention by use of the "quenching" type of current limiter as device 19 instead of a "regulating" limiter. Operation of the invention in this case is similar to that just described except that the quenching current limiter drives the current in the by-pass path quickly to zero and maintains it there long enough for the vacuum gap device 18 to restore a high-dielectric condition, to block further current flow. Also, the quenching limiter is preferably designed so that the time required for current flow therethrough to produce "firing" is long enough to permit the contact-separating member 15 to restore good dielectric conditions between its opened contacts. Complete current interruption in this form therefore occurs at high speed and in a time less than a half-cycle, since it is not necessary in this form to wait for a current-zero point on the A-C current wave.

Figure 6:
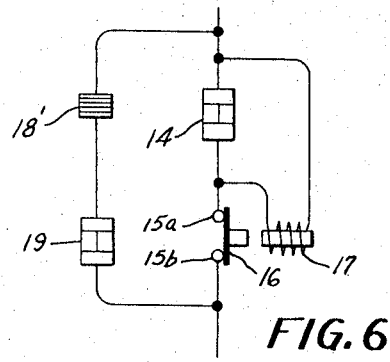

In the form of the invention illustrated in FIGURE 6, a semi-conductor device comprising a "four-layer switch" 18′ is utilized in place of the vacuum-gap device 18. This device has the characteristic of being non-conducting or blocking until a critical voltage is applied across it sufficient to cause breakdown and "avalanche" conduction. In other words, the device 18′, which is a solid state device, functions electrically in a manner comparable to the vacuum gap device 18.

Figure 2:
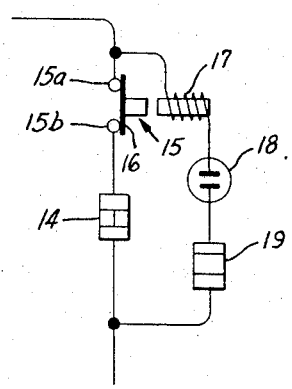
FIGURES 2 through 8 are schematic diagrams of additional embodiments of the invention.

In the form illustrated in FIGURE 2, the winding 17 of the contact operating device 15 is included in the by-pass path comprising vacuum gap device 18 and current limiter 19. In this form, firing of the limiter 14 due to over-current creates a voltage which breaks down or fires the vacuum gap device 18, initiating current in the by-pass path. When this occurs, the winding 17 is energized and acts to open the bridging contact member 16, the current through the contacts 15a, 15b and 16 being thereupon reduced to zero, and the contact member 16 being retained in open circuit position by suitable means, not shown.

Figure 3:
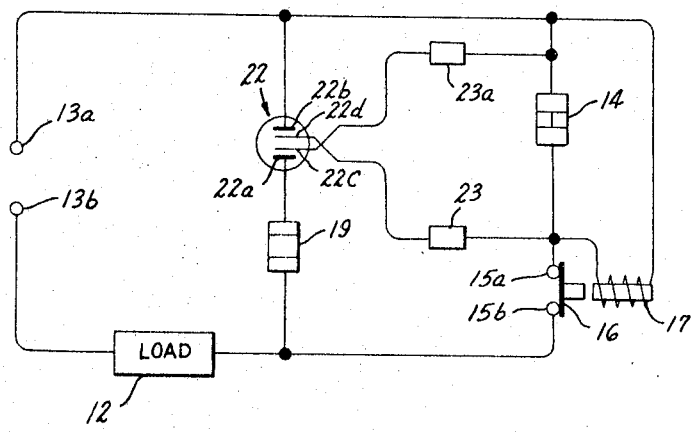

The embodiment of the invention shown in FIGURE 3 of the drawings is in many respects similar to the circuit breaker shown in FIGURE 1 in that a main current carrying circuit branch is formed by a series connection of physically separable contacts 15a, 15b and 16 of a contactor mechanism and a regulating current limiter device 14. The actuating winding 17 of the solenoid-actuated contactor mechanism is connected across the regulating current limiter device 14. Interruption assisting means is provided by a parallel assisting circuit comprising a triggered vacuum gap or "TVG" device 22 and a current limiter 19. The TVG device has a pair of trigger electrodes connected through limiting impedances 23, 23A to opposite terminals of the regulating current limiter 14. The invention is, however, not limited to this specific triggered vacuum gap device structure. The power electrodes of the triggered vacuum gap 22 are connected in series circuit relationship with a quenching current limiter 19 and the series circuit thus comprised is connected in parallel with the main circuit branch comprised by series connected load 12, contacts 15a, 15b and 16 and regulating current limiter 14.

A suitable triggered gap for this purpose is disclosed in U.S. Patent No. 3,303,376—J. M. Lafferty, inventor, issued Feb. 7, 1967, for "Triggered Vacuum Gap Device Employing Gas Evolving Electrodes," and assigned to the General Electric Company.

In operation the circuit of FIGURE 3 functions in a manner similar to the circuit of FIGURE 1. However, because of the triggered nature of the triggered vacuum gap 22, it is much more sensitive to the rise in voltage across the regulating current limiter 14 and, hence, can be made to switch in the parallel assisting path at a somewhat lower voltage and more reliably. For a more detailed description of a typical triggered vacuum gap, reference is made to the above-identified Patent 3,087,092. However, for the purpose of the instant disclosure it is believed sufficient to point out that the voltage generated by the limiter 14 appears as triggering voltage (1) between trigger electrode 22c and power electrode 22a and (2) between trigger electrode 22d and power electrode 22b, the polarity relationships of (1) and (2) being reversed with respect to each other and the specific polarity status depending on the polarity status of the source voltage. In any case, a triggering arc will be created between at least one of the trigger electrodes 22c, 22d, and its adjacent power electrode 22a, 22b, initiating breakdown directly between the electrodes 22a, 22b. In all other respects the circuit operates similarly to the circuit of FIGURE 1.

Figure 4:
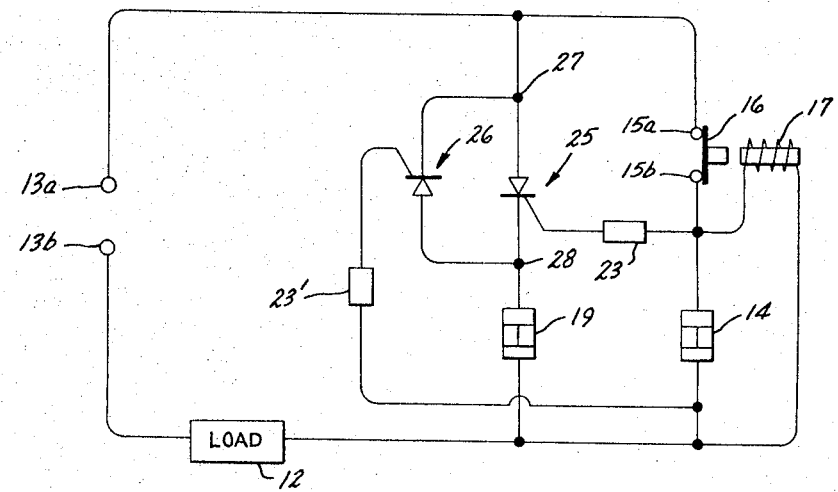

FIGURE 4 of the drawings illustrates another embodiment of the invention wherein the switching means employed in the parallel assisting circuit path comprises gate-controlled, power semiconductor devices. In the FIGURE 4 circuit the gate-controlled, power semiconductor devices comprise silicon controlled rectifiers 25, 26 (hereinafter called SCR's) connected in reverse polarity, parallel circuit relationship with each other and in series circuit relationship with current limiter 19. The control gate electrodes of the two reverse polarity, parallel connected SCR's 25, 26 are connected through respective current reducing resistors 23, 23′ respectively, to opposite terminals of the current limiter 14. In this embodiment of the invention, the rise in voltage across the current limiter 14 is employed to trigger "on" either one or the other of the SCR's 25 or 26 depending upon the instantaneous polarity of the potential supplied across the input terminals 13a and 13b. Otherwise, the operation of the circuit of FIGURE 3 is similar to the operation of the previously described circuit shown in FIGURE 2, and a further detailed description of the manner of operation of the circuit is believed unnecessary. It is noted, however, that in the event that the circuit of FIGURE 4 is used with a direct current supply potential, only a single SCR such as 25 or 26 may be employed in place of the parallel connection illustrated.

Figure 5:
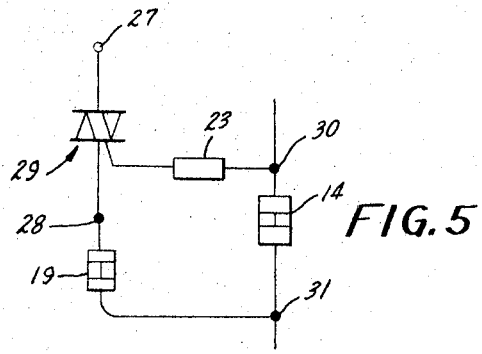

FIGURE 5 of the drawings illustrates a modified form of the FIGURE 3 circuit wherein a single, bilateral semiconductor triode known as a "triac" and shown at 29 may be employed in place of the parallel connected SCR's 25 and 26 shown in FIGURE 3. For this purpose the triac 29 may have its load terminals shown at 27 and 28 connected in place of the correspondingly marked terminals shown in FIGURE 3. The single control electrode of the triac 29 is connected through a suitable current limiting resistor 23 to terminal 30 of the regulating current limiter 14. Terminal 28 of the triac 29 is connected through quenching current limiter 19 to terminal 31 of regulating limiter 14. In operation of the embodiment of the invention shown in FIGURE 5 functions in the same manner as the circuit of FIGURE 4.

Figure 7:
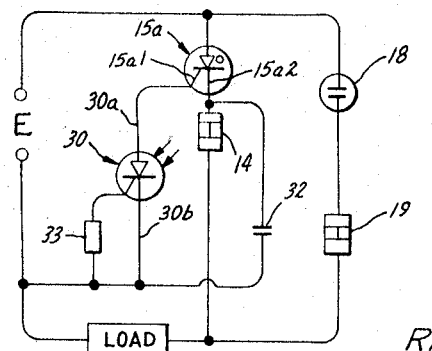

The form of the invention shown in FIGURE 7 is generally similar to that shown in FIGURE 1 except that the main current control device comprises a solid state switching device 15a known in the trade as a "gate turn-off" switch or "gate controlled switch." A device of the type referred to is manufactured by the General Electric Company and is designated type GTO. The gate turn-off switch 15a has the characteristic that it can be turned off by a negative pulse of current from the gate electrode 15a1 to the cathode electrode 15a2.

Such a turn-off pulse of current is suppled to the gate 15a1 of the device 15a by a circuit controlled by a light-actuated solid-state switch 30, which, when turned on, serves to complete a circuit permitting a capacitor 32 to discharge through the anode-cathode path, 30a–30b respectively of the switch 30.

The solid state switch 30 is turned on by light from the limiter 14 which is provided with translucent ceramic insulating body, and the device 30 being positioned closely adjacent thereto. A resistor 33 provides, with capacitor 32, a turn-on bias sufficient to initiate conduction in the device 30 only when the device 30 receives light from the limiter 14. A suitable light-activated solid state switch is manufactured by the General Electric Company and is identified as type LASCR (light-activated SCR).

Figure 8:
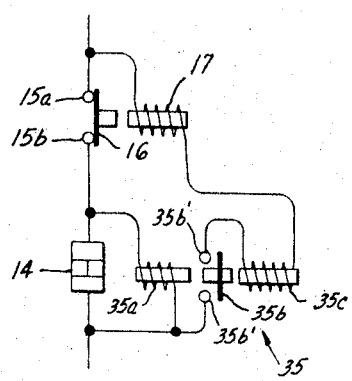

In the form of the invention shown in FIGURE 8, a second contact operating device 35 is used in place of the vacuum-gap and limiter combination of FIGURE 2. Upon firing of the limiter 14 in this form, current is forced into highly resistive winding 35a, which acts on the movable contact member 35b to close the contacts 35b'. This completes the by-pass circuit, energizing the trip coil 17 opening circuit breaker contacts 15a, 15b. When the current reaches sufficient magnitude in the branch path, coil 35c acts to trip out contacts 35a, 35b, completing the interruption. The interrupter 15 is a conventional low interrupting capacity circuit breaker, while the interrupter 35 is a high interrupting capacity breaker.

In addition to the species of the invention shown, it is believed obvious that other suitable switching means may be employed in the parallel assisting path in place of the vacuum gap or semiconductor devices illustrated. For example, a gas discharge device such as a thyratron, or a gate controlled mercury arc rectifier, could be employed in the circuit. Other similar modifications will be suggested to those skilled in the art.

From the foregoing description, it can be appreciated that the invention provides a relatively low cost, parallel assisted circuit interrupter which employs both a current limiter of the vaporizable conductor type for quickly limiting current flow through the circuit to some predesigned safe low value and thereafter shunts the arc current to a parallel assisting path for permanently interrupting current flow through the circuit. In addition, with the exception of the form of the invention shown in FIGURE 8, no large currents are required to be interrupted by mechanically separable movable contacts. Such contacts are required to interrupt only small currents with a minimum of arcing thereby assuring reliable operation of the circuit as well as greatly lengthening its operating life. In the form of FIGURE 8, however, the circuit breaker 35 is designed to carry high currents and to interrupt such currents as required.

Having described several embodiment of a new and improved current limiting protective circuit interrupter constructed in accordance with the invention, it is believed obvious that other modifications and variations of the invention are possible in the light of the above teachings.

What I claim as new and desire to secure by Letters Patent of the United States is:

1. An electric circuit interrupter for an electric circuit comprising:
   (a) first automatically operable electric switching means operable between on and off conditions;
   (b) first current limiting means having the characteristic of changing from relatively low impedance state to relatively high impedance state upon the occurrence of excess current therethrough;
   (c) means connecting said automatically operable switching means and said first current limiting means electrically in series;
   (d) second automatically operable switching means operable between on and off conditions;
   (e) second current limiting means;
   (f) means connecting said second automatically operable switching means and said second current limiting means in series to form a by-pass path in shunting relation to said series combination of said first automatically operable electric switching means and said first current limiting means;
   (g) means operating said second automatically operable switching means from said off condition to said on condition in response to change of said first current limiting means from said low impedance state to said high impedance state to shift current flowing through said circuit from said first automatically operable switching means to said by-pass path, and
   (h) means operating said first automatically operable switching means in response to said change of said first current limiting means from said on to said off condition.

2. An electric circuit interrupter as set forth in claim 1 wherein said first automatically operable electric switching means includes a pair of co-acting separable contacts.

3. An electric circuit interrupter as set forth in claim 1 wherein said first automatically operable electric switching means comprises a pair of co-acting separable contacts, and wherein said means causing automatic opening of said first automatically operable switching means comprises electro-magnetically operable means including a coil connected in parallel to said first current limiting means, whereby said change of said first current limiting means from said low impedance state to said high impedance state causes increased current in said coil and actuation of said first automatically operable switching means to said off condition.

4. An electric circuit interrupter as set forth in claim 1 wherein said first automatically operable switching means comprises a pair of co-acting separable contacts and wherein said first current limiting means comprises an element having first and second electric terminals and a conductor section intermediate said terminals comprising a vaporizable conductive material confined within an insulating enclosure, said vaporizable conductor being transformed into a vapor upon the passage of predetermined current therethrough to limit current flow between said terminals and thereafter recondensing to reestablish current conductivity between said terminals.

5. An electric circuit interrupter as set forth in claim 1 wherein said first current limiting means comprises a positive temperature coefficient of resistance resistor.

6. An electric circuit interrupter as set forth in claim 1 wherein said second automatically operable switching means comprises a vacuum gap breakdown device having the characteristic of being non-conductive at voltages below a predetermined voltage and breaking down and becoming conductive at voltages above said predetermined voltage.

7. An electric circuit interrupter as set forth in claim 1 wherein said first current limiting means comprises a vaporizable conductor type and wherein said second automatically operable switching means comprises a vacuum gap breakdown device, said first current limiting means changing from said conductive state to said vapor state suddenly and creating a voltage drop thereacross in excess of said voltage required to breakdown said vacuum gap device.

8. An electric circuit interrupter as set forth in claim 1 wherein said second current limiting means comprises an element of the vaporizable conductor type.

9. An electric circuit interrupter as set forth in claim 7 wherein said second current limiting means also comprises a vaporizable conductor type device.

10. An electric circuit interrupter as set forth in claim 1 wherein said second automatically operable switching means comprises a triggered vacuum gap device, and wherein said means causing automatic closing of said second automatically operable switching device comprises means applying said voltage developed across said first current limiting means to said trigger of said triggered vacuum gap device.

11. An electric circuit interrupter as set forth in claim 1 wherein said second automatically operable switching means comprises a solid state electronic control device.

12. An electric circuit interrupter as set forth in claim 11 wherein said solid state switching device comprises a pair of controlled rectifiers connected electrically in parallel in reverse conducting sense.

13. An electric circuit interrupter as set forth in claim 11 wherein said solid state switching device comprises a triac.

14. An electric circuit interrupter as set forth in claim 11 wherein said solid state switching device comprises a four-layer switch.

15. An electric circuit interrupter as set forth in claim 1 wherein said first automatically operable switching means comprises a solid state switching device.

16. An electric circuit interrupter as set forth in claim 15 wherein said solid state current controlled device comprises a gate turn-off control rectifier and wherein said means causing automatic opening of said first automatically operable switching means comprises a light actuating controlled rectifier acted on by light emitted from said first current limiting means, and means connecting said light actuated controlled rectifier in circuit relation with said control electrode of said gate turn-off device and a source of electric potential whereby actuation of said light actuated controlled rectifier to the conducting condition applies said source of electric potential to said gate turn-off and places said gate turn-off device in the non-conducting condition, and wherein said first current limiting means comprises a vaporizable conductor type contained in a translucent housing permitting passage of light from said vaporized conductor.

17. An electric circuit interrupter as set forth in claim 1 wherein said means causing automatic opening of said first automatically operable switching means comprises means actuated by current flowing in said shunting circuit.

18. An electric circuit interrupter as set forth in claim 17 wherein said first automatically operable electric switching means includes a pair of co-acting separable contacts and wherein said means actuated by said current in said shunt circuit comprises an electro-magnetic coil acting to cause opening of said contacts.

19. An electric circuit interrupter as set forth in claim 1 wherein said first automatically operable electric switching means and said second automatically operable electric switching means each comprise a pair of co-acting separable contacts, and wherein said means causing automatic closing of said automatically operable switching means comprises means actuated by voltage appearing across said first current limiting means, said means causing automatic opening of said first automatically operable switching means comprises means operable in response to current through said shunt circuit, and wherein said electric circuit interrupter also includes means operable in response to the occurrence of predetermined current through said shunt circuit to re-open said second automatically operable switching means.

References Cited

UNITED STATES PATENTS

| | | | |
|---|---|---|---|
| 3,238,418 | 3/1966 | Heft | 317—33 |
| 3,407,335 | 10/1968 | Hartung | 317—33 X |

JOHN F. COUCH, *Primary Examiner.*

J. D. TRAMMELL, *Assistant Examiner.*

U.S. Cl. X.R.

317—16, 20, 33